(12) United States Patent
Hultén et al.

(10) Patent No.: US 12,091,102 B2
(45) Date of Patent: Sep. 17, 2024

(54) POWER ASSISTED STEERING SYSTEM ARRANGEMENT

(71) Applicant: SENTIENT IP AB, Gothenburg (SE)

(72) Inventors: Johan Hultén, Gothenburg (SE); Jochen Pohl, Partille (SE)

(73) Assignee: SENTIENT AB, Gothenburg (SE)

( * ) Notice: Subject to any disclaimer, the term of this patent is extended or adjusted under 35 U.S.C. 154(b) by 719 days.

(21) Appl. No.: 17/282,785

(22) PCT Filed: Oct. 31, 2019

(86) PCT No.: PCT/SE2019/051097
§ 371 (c)(1),
(2) Date: Apr. 5, 2021

(87) PCT Pub. No.: WO2020/111997
PCT Pub. Date: Jun. 4, 2020

(65) Prior Publication Data
US 2021/0387666 A1     Dec. 16, 2021

(30) Foreign Application Priority Data
Nov. 28, 2018 (SE) .................... 1851476-0

(51) Int. Cl.
*B62D 5/04* (2006.01)
*B62D 3/08* (2006.01)

(52) U.S. Cl.
CPC ............. *B62D 5/0403* (2013.01); *B62D 3/08* (2013.01); *B62D 5/0418* (2013.01); *B62D 5/0421* (2013.01)

(58) Field of Classification Search
CPC ...... B62D 5/0403; B62D 3/08; B62D 5/0418; B62D 5/0421
See application file for complete search history.

(56) References Cited

U.S. PATENT DOCUMENTS 2,553,940 A    5/1951  Quartullo
2,820,872 A    1/1958  Carr
(Continued)

FOREIGN PATENT DOCUMENTS

CN    101119884    2/2008
CN    101 450 677  6/2009
(Continued)

OTHER PUBLICATIONS

International Search Report issued in parent PCT/SE2019/051097, Nov. 3, 2020, pp. 1-2.
(Continued)

*Primary Examiner* — Kevin Hurley
*Assistant Examiner* — Michael R Stabley
(74) *Attorney, Agent, or Firm* — Jeffrey S. Melcher; Melcher Patent Law PLLC (57) ABSTRACT

The present invention relates to a power assisted steering system arrangement (100A) for a vehicle comprising a steering wheel (120A), a first, driver, link arrangement (10A) comprises a linkage between the steering wheel (120C) and the front wheels (127,127) comprising a steering column (121A), a Recirculating Ball Joint, RCB, (123A) arranged on a first side of the vehicle, a track rod arrangement for steering the front wheels (127,127), a first lever arm (124A) arranged to transfer a driver torque applied by via the steering wheel to the track rod arrangement providing a connection between the RCB (123A) and the track rod arrangement. The system further comprises a torsion bar (128A) with a torsion-bar torque sensor associated with the steering column (121A), an assistance actuator (30A), arranged on a second side of the vehicle, opposite to the side of the vehicle where the RCB is arranged, said assistance actuator (30A) comprising at least an electric motor (115A) and an Electronic Control Unit, ECU, (110A) controlling the
(Continued)

electric motor depending on control signals received from the torsion-bar torque sensor, and an assistance actuator link arrangement (20A) connected to said track rod arrangement, so that a steering torque applied by the driver as well as an assistance actuator torque provided or applied by the assistance actuator (30A) is transferred to the track rod arrangement steering the front wheels of the vehicle.

14 Claims, 3 Drawing Sheets

(56) References Cited

U.S. PATENT DOCUMENTS

| | | | |
|---|---|---|---|
| 4,624,336 A | 11/1986 | Eddy | |
| 8,567,554 B2* | 10/2013 | Zaloga | B62D 5/0421 180/446 |
| 9,180,907 B2* | 11/2015 | Deimel | B62D 5/12 |
| 10,005,455 B2* | 6/2018 | Hultén | B62D 5/0463 |

| | | |
|---|---|---|
| 2013/0032430 A1 | 2/2013 | Zaloga |
| 2014/0157922 A1 | 6/2014 | Schneider |
| 2014/0291061 A1 | 10/2014 | Deimel |
| 2016/0272197 A1 | 9/2016 | Hulten |

FOREIGN PATENT DOCUMENTS

| | | |
|---|---|---|
| CN | 103303361 | 9/2013 |
| JP | H03 178866 | 8/1991 |
| WO | 2010/144049 | 6/2010 |

OTHER PUBLICATIONS

Written Opinion issued in parent PCT/SE2019/051097, Nov. 3, 2020, pp. 1-6.
Search Report issued in corresponding Chinese Patent Application No. 201980078956.4, Jul. 19, 2023, pp. 1-3.
Office Action issued in corresponding Chinese Patent Application No. 201980078956.4, Jul. 19, 2023, pp. 1-5.

* cited by examiner

POWER ASSISTED STEERING SYSTEM ARRANGEMENT

TECHNICAL FIELD

The present invention relates to a power assisted steering system arrangement having the features of the first part of claim 1.

BACKGROUND

For heavy trucks or large pick-ups, there is no space for a rack and pinion steering that normally is used for passenger cars, where the steering rack is mounted on a sub-frame, which is non-existing for heavier vehicles. Therefore, for heavy vehicles, particularly for heavy trucks, other solutions have had to be used. It is common to use a recirculating ball gearbox (RCB), a Pitman arm, a track rod and two tie rods to steer the two steering arms that turn and steer the vehicle front wheels.

Figure 1:
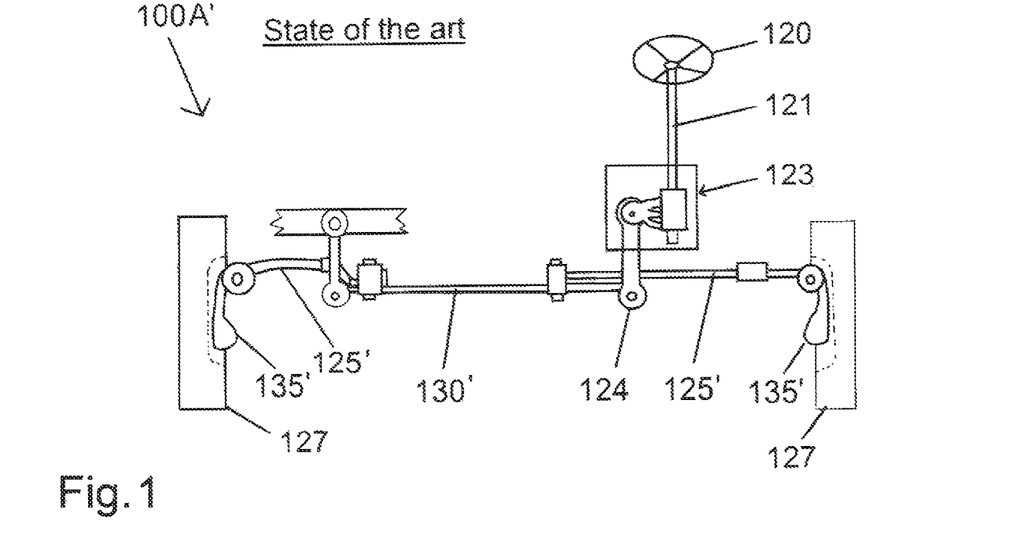
FIG. 1 is a schematic view of a traditional, state of the art, steering system for a heavy truck.

An example of one such prior art steering system layout, that also will further described below, is shown in FIG. 1 of the present application.

Figure 2:
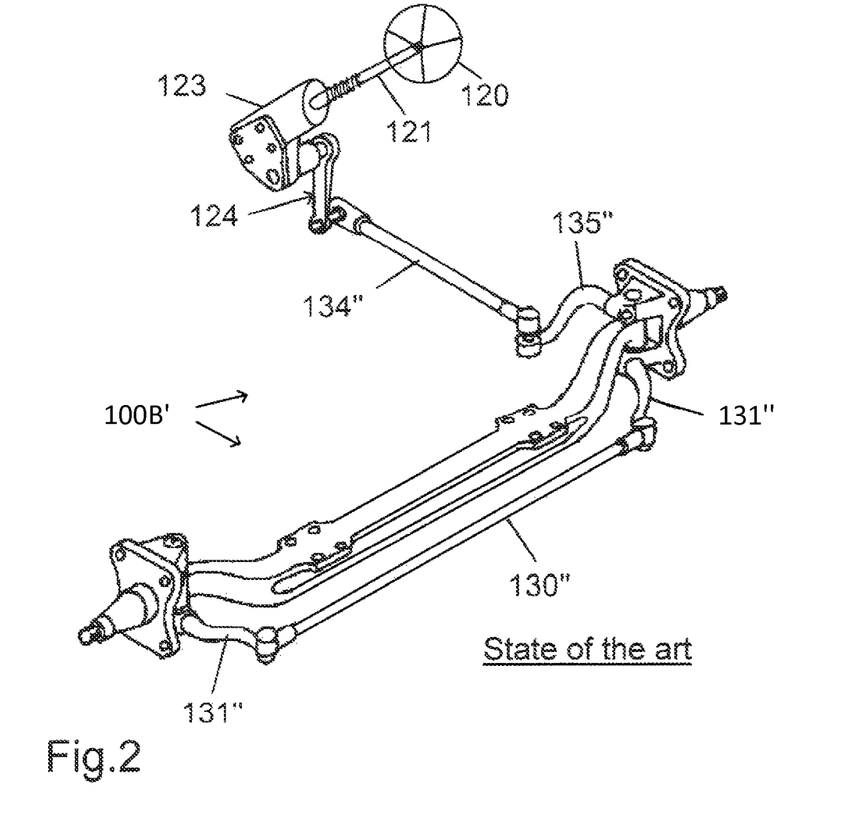
FIG. 2 is schematic view of another traditional, state of the art, steering system for a heavy truck.

Another prior art steering system layout is shown in FIG. 2. Here, the Pitman arm is not directly affecting the track rod. Instead, there is a linkage to the stub axle and another linkage to transfer the steering angle between the two stub axles.

The linkage to the stub axle consists of (from the Pitman arm or drop arm) a drag link and a drag-link arm (or steering arm) with joints in between. The linkage for transferring the steering angle consists of two track-rod arms and a track rod with joints in between.

Figure 3:
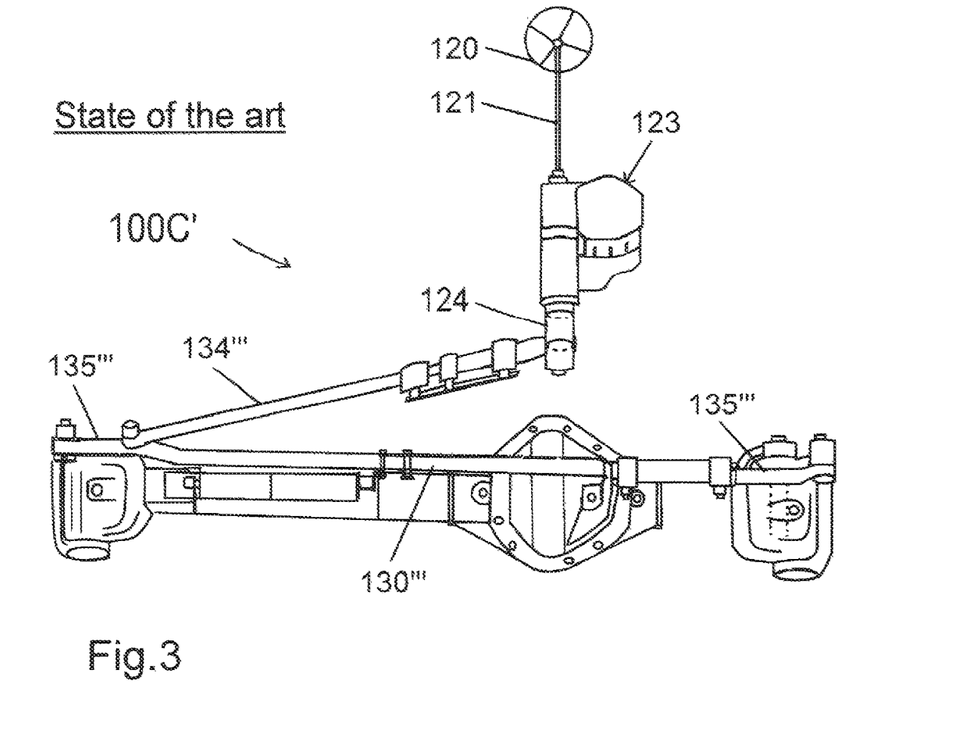
FIG. 3 is a schematic view of still another state of the art steering system for a heavy truck, FIG. 4 schematically illustrates an electrically assisted steering system arrangement for a heavy vehicle according to a first embodiment of the present invention, FIG. 5 schematically illustrates an electrically assisted steering system for a heavy vehicle according to a second embodiment of the present invention, and FIG. 6 schematically illustrates an electrically assisted steering system for a heavy vehicle according to a third embodiment of the present invention.

Still another prior art solution of a steering system layout is shown in FIG. 3. In the solution shown in FIG. 3 there is a drag link from the Pitman arm to the steering arm of the passenger side. The linkage between the wheels also here comprises a track rod.

Power assisted steering is on heavy trucks incorporated in the RCB, where the assistance force is achieved by hydraulic power. The driver applies a torque in the steering column, which results in a twist in a valve in the gearbox, so that the valve opens up a hydraulic fluid pressure to one chamber of a cylinder inside the RCB, where the cylinder also is the nut of the recirculating ball screw. Therefore, the screw is turned by the driver and the nut is axially powered by hydraulic power, resulting in an assistance depending on the torque applied by the driver in the steering column.

Hydraulic power has very high power density. Therefore, a power assisted RCB is very compact and easy to fit to the side of the frame of the vehicle. Normally there is very limited space around the engine of the vehicle, and the RCB just fits in the free space. Therefore, there is limited space around the RCB to add new sub-systems.

There are however disadvantages associated with using hydraulic power since it requires filling of fluid, monitoring the level of fluid, there are risks of fluid leaking over time etc.

There is now a trend towards electrification of vehicles. It has been realized that there would be enough electric power available to use also for power assisted steering. It would therefore be advantageous to be able to have electric power assisted RCBs.

However, while hydraulics has a high power density, and is easy to fit in the RCB, electric motors with gear boxes are not. An unassisted RCB will, without the hydraulics, be slightly smaller, but the size reduction is not even close to what would be needed for mounting an electric motor with a reduction gear above it and providing the same amount of assistance as a traditional hydraulic assistance system.

Thus, in many cases there is not a sufficient package volume available to fit an electric motor with a reduction gear which is a serious problem and which constitutes an obstacle for introducing electric power assisted RCBs.

SUMMARY

It is therefore an object of the present invention to provide a power assisted steering system arrangement through which one or more of the above mentioned problems can be solved.

It is particularly an object of the invention to provide a power assisted steering system arrangement which is simple and cost effective. Still further it is a particular object of the invention to provide a power assisted steering system arrangement which is flexible and compact.

It is particularly an object of the invention to provide power assisted steering system arrangement which has a high assistance performance, is suitable for left hand as well as for and right-hand drive vehicles.

Therefore, a power assisted steering system arrangement as initially referred to is provided which has the characterizing features of claim 1.

Advantageous embodiments are given by the appended dependent claims.

It is an advantage of the invention that it enables electric power assisted steering of heavy trucks. It is also an advantage that an arrangement is provided which easily can be packed in the package volumes for RCBs available for left- and right-hand drive vehicles. With a solution according to the invention available space can be used efficiently, the spaces on the driver side as well on the passenger side will be taken advantage of, for left and right hand driven vehicles, and a very simple and cost effective solution is provided.

It is also an advantage of the invention that it facilitates manufacturing and assembly and enables a reduction in the maintenance and monitoring of the assistance system, and further that consumption and leakage of hydraulic fluids can be avoided, and still further that an environmentally friendly steering assistance solution is provided.

BRIEF DESCRIPTION OF THE DRAWINGS

The invention will in the following be further described by way of example only, in a non-limiting manner, and with reference to the accompanying drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims and the description as a whole. It should be further understood that the drawings are not necessarily drawn to scale and that, unless otherwise indicated, they are merely intended to conceptually illustrate the structures and procedures described herein. The same, but differently indexed, reference numerals are used for illustrating corresponding features in the different drawings.

DETAILED DESCRIPTION

In order to facilitate the understanding of the invention, a number of definitions will be introduced below, and some different prior art solutions based on hydraulic assistance will be described with reference to FIGS. 1-3.

Definitions

A steering position actuator is an actuator which can be used to influence one or more of the steering actuator states, such as the rear wheel steering angle, the individual steering angles of the wheels, the axle braking torque or force, the wheel braking torque or force, the driving torque or force on the individual axles, the driving torque or force on the individual wheels, the camber angle on each axle, or the camber angle on each wheel.

A state is defined as a translational or rotational position, a velocity or an acceleration, or from one or more of these states derived states, such as e.g. a vehicle slip angle, which is the angle between the vehicle local x-axis and the vehicle speed vector.

A signal bus is a transmission path on which signals can be read and/or transmitted.

Controllability describes the ability of an external input to move the internal state of a system from any initial state to any other final state in a finite time interval.

A vehicle state controller is here defined as a dynamic function for achieving a target state in a vehicle in a controlled manner.

A vehicle state actuator, is an actuator that when actuated influences one or several vehicle states. Examples of vehicle state actuators are brakes, engine, controllable four-wheel-drive clutches, controllable differentials, active dampers, electric or hydraulic wheel motors and electrically or hydraulically driven axles.

An actuator is a mechanism or system that is operated by an ECU and converts a source of energy, typically electric current, hydraulic fluid pressure, or pneumatic pressure, into a motion, force or torque.

A target value, reference value or request is a set point for the actuator that is achieved by the use of either a closed loop controller and/or a feed-forward controller.

A steering-wheel torque measurement is a torque measured in the steering column or steering wheel or a force measured in the steering rack times the torque ratio between the steering rack and the steering wheel.

A steering-wheel angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

The steering angle, which is here shown for one wheel, but if the wheels are steered differently, as in the case for e.g. Ackermann steering, the steering angle is defined as the mean value of the angles of the two wheels.

A recirculating ball gearbox (RCB) is a steering gear that uses a recirculating ball screw to convert an incoming torque applied by the driver in the steering wheel to an outgoing torque in a lever arm, a Pitman arm, which via a linkage steers the front wheels. The RCB can be with or without hydraulic assistance.

A torsion-bar torque is a torque measured by the use of a sensor that is sensitive to a twist of a specific torsion bar that is mounted somewhere in the steering column.

The torsion-bar torque sensor can preferably be of the kind that has both torque and angle sensing, a so-called Torque and Angle Sensor (TAS).

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

FIG. 1 is a schematic view of a state-of-the-art steering system 100A' for which the inventive concept based on electric assistance (instead of hydraulic assistance) can be implemented as will be described below with reference to FIG. 4. In a hydraulic power assisted steering system, as in FIG. 1, the hydraulic assistance (not shown in FIG. 1) being provided in association with the RCB of a vehicle, there is a linkage between the front axle road wheels 127 and the steering wheel 120.

The linkage consists of a steering column 121, an RCB 123, a Pitman arm 124, a track rod 130' and, here, two tie rods 125' to steer the two steering arms 135' that turn and steer the front wheels 127. It should be noted that there are one or two tie rods for wheel alignment purposes. Systems exist which have none, one or two tie rods.

FIG. 2 is a schematic view of another type of steering system 100B' for which the inventive concept can be implemented as will be described with reference to FIG. 5. Here the linkage between the front axle road wheels 127 and the steering wheel 120 consists of a steering column 121, an RCB 123 with hydraulic assistance (not shown), a Pitman arm 124, a drag link 134", which in this figure essentially extends in a longitudinal direction of the vehicle, a steering arm 135", two track-rod arms 131" with a track rod 130" in between.

FIG. 3 is a schematic figure of still another steering system 100C' for which the inventive concept can be implemented as will be described with reference to FIG. 6. Here the linkage between the front axle road wheels 127 and the steering wheel 120 consists of a steering column 121, an RCB 123 with hydraulic assistance (not shown), a Pitman arm 124, a drag link 134''', which in this figure essentially extends in a lateral direction of the vehicle, a steering arm 135''', two track-rod arms 131''' with a track rod 130''' in between.

The invention relies on the fact that there are both left and right-hand drive vehicles, which in turn means that there are available package volumes for steering gears and steering linkage on each side of the vehicle. Therefore, a basic idea of this invention is to use one side for an unassisted RCB, which is used to transfer the steering torque of the driver from the steering wheel to the road wheels, and, regardless of whether the system setup is according to FIG. 4, 5 or 6, use available package volume, to provide an electric power assistance on the passenger side of the vehicle, or more generally on the other side, the side opposite to the side where the RCB is mounted, the RCB as a rule being mounted on the driver side of the vehicle.

Figure 4:
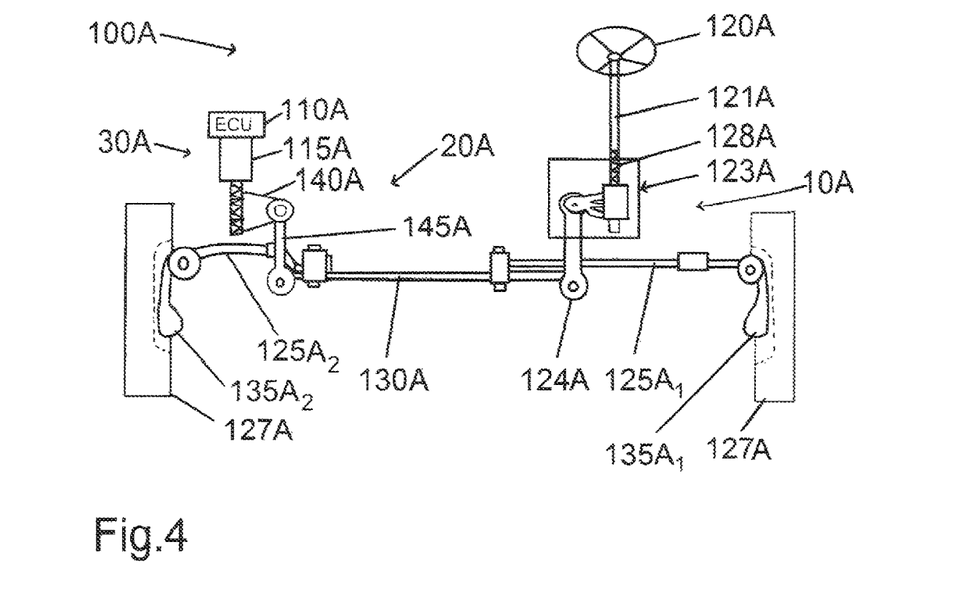

FIG. 4 is a schematic view of a power assisted steering system arrangement 100A according to a first embodiment of the present invention. It comprises a steering wheel 120A, and a first, driver, link arrangement 10A comprising a linkage similar to the linkage described with reference to FIG. 1 and which here is defined to comprise a steering column 121A, an RCB 123A, a first lever arm, particularly a Pitman arm, 124A, which here is provided on the driver side of the vehicle, and a track rod arrangement. The first lever arm 124A is arranged to transfer the torque applied by the driver via the RCB 123A to the track-rod arrangement also forming part of the first link arrangement 10A and here comprising a track rod 130A and two tie rods $125A_1, 125A_2$ to steer two steering arms $135A_1, 135A_2$ that turn and steer the front wheels 127A,127A. Here the first lever arm 124A is arranged to transfer the driver torque to the track rod 130A. The RCB 123A and the first lever arm, e.g. the Pitman arm 124A, are interconnected by means of a splined connection or any other fixed connection.

The power assisted steering system arrangement 100A comprises an assistance actuator 30A which here is located on the passenger side of the vehicle, or more generally on the side where the (unassisted) RCB 123A is not disposed, or in short the side opposite to the side where the RCB 123A is located, where space is available.

The power assisted steering system arrangement 100A further comprises a second link arrangement 20A, also denoted an assistance actuator link arrangement, for transferring an assistance actuator torque from the assistance actuator 30A to the first link arrangement 10A, here to the track rod 130A, the track rod 130A as referred to above here being the link that steers the front road axle wheels 127. The second, or assistance actuator, link arrangement 20A here comprises an assistance arm 145A which is arranged between the assistance actuator 30A, the steering actuator, and the track rod 130A.

Furthermore, the steering column 121A incorporates a torsion bar 128A with a torque sensor for measuring the steering torque applied by the driver. The assistance torque is actuated by the steering assistance actuator 30A, which at least comprises an electric assistance motor 115A and an ECU 110A, and optionally also comprises an assistance gear 140A. The assistance gear 140A, if any, is then connected to the assistance arm 145A by means of a splined connection or any other fixed connection.

The control of the level of assistance actuation in the steering assistance actuator 30A is controlled by a control system in ECU 110A.

In order to control the assistance of the assistance actuator 30A, the torsion bar 128A with the torsion bar torque sensor is mounted in the RCB 123A on the steering wheel side, between the RCB 123A and the steering column 121A. The sensed value in the torsion bar 128A, the torsion-bar torque, is then sent via a communication means, e.g. a signal bus or similar, to the ECU 110A, that is attached on, or close by, the electrical motor 115A.

The control of the motor is made as follows: A torsion-bar torque is measured in the RCB or steering column by the use of a, well known, torsion-bar torque sensor. The sensed torsion-bar torque value, that is sent via a communication means, e.g. a signal bus or similar, to the ECU 110A, is in the ECU used to calculate a target torque of the motor. Optionally, several other sensed values can be used in the calculation of the target assistance torque such as e.g. steering-wheel angle, motor angle, vehicle speed. This target torque is then actuated by the use of a, for a person skilled in the art well known, torque controller.

The assistance gear 140A, if any, is a reduction gear, where the output shaft of the reduction gear is mounted to the second lever arm comprising an assistance arm 145A so that the assistance arm 145A will be subjected to an assistance torque (just as the Pitman arm 124A normally is when hydraulic assistance is implemented). The reduction gear between the electric assistance motor 115A and the assistance arm 145A is typically arranged in the form of a sector worm gear or spur gear since the angular range of the assistance arm 145A is very small and the gear ratio is very high, and hence the outgoing gear wheel will be very large, but turn very little so that only a small sector of this wheel will be used, and hence the name sector gear. For a sector gear, the unused portion of the outgoing gear wheel is removed. By the use of a sector gear, the packaging volume will be small even if the radius of the sector wheel is large. Furthermore, the ratio of the reduction gear will make the size of the motor smaller compared with an implementation without any reduction gear.

The assistance actuator may in some embodiments comprise an assisted RCB.

Through a solution as described with reference to FIG. 4 it becomes possible to have electrically power assisted steering of heavy trucks and an arrangement is provided which allows easy packing through using the package volumes for RCBs available for left- and right-hand drive vehicles. With such a solution, both spaces, i.e. the space on each side of the vehicle, will be taken advantage of and a very simple and cost-effective solution is provided.

Figure 5:
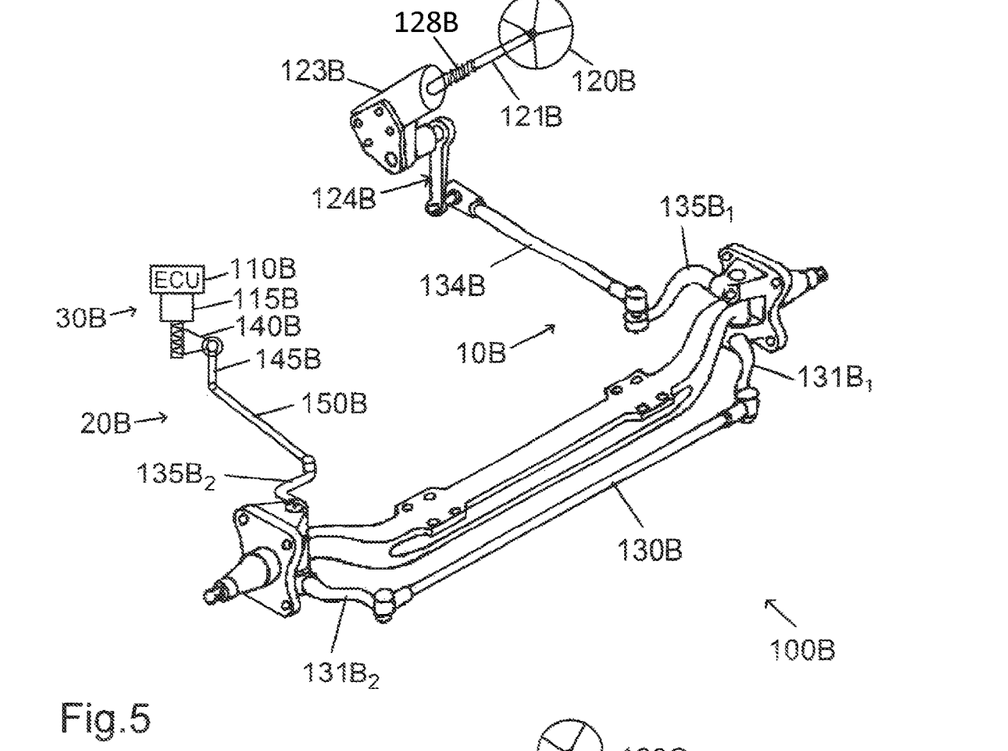

FIG. 5 is a schematic view of an alternative steering system 100B in which the inventive concept is implemented according to a second embodiment of the present invention. It comprises a steering wheel 120B and a first link arrangement 10B, also called a driver link arrangement, comprising a linkage similar to the linkage described with reference to FIG. 2 and which comprises a linkage between the front axle road wheels (not shown in FIG. 5) and the steering wheel 120B. The first link arrangement 10B is here defined to comprise a steering column 121B, an RCB 123B, a first lever arm, here e.g. a Pitman arm 124B, a drag link 134B, which in FIG. 5 essentially extends in a longitudinal direction of the vehicle, a track rod arrangement comprising a driver side steering arm $135B_1$ and two (driver side and passenger side) track-rod arms $131B_1$, $131B_2$ with a track rod 130B in between. The RCB 123B and the first lever arm, e.g. the Pitman arm 124B, are interconnected by means of a splined connection or any other fixed connection.

The power assisted steering system arrangement 100B comprises an assistance actuator 30B which here is located on the passenger side of the vehicle, or more generally on the side where the RCB 123B is not disposed, or in short the side opposite to the side where the RCB 123B is located, where space is available.

The power assisted steering system arrangement 100B further comprises a second link arrangement 20B, also denoted an assistance actuator link arrangement, for transferring an assistance actuator torque from an assistance actuator 30B to the first link arrangement 10B, here to the track rod arrangement, more particularly to the passenger side track-rod arm $131B_2$. The second link arrangement 20B in this embodiment comprises an assistance arm 145B, an assistance steering rod 150B and a passenger side steering arm $135B_2$ connected or articulated to the passenger side track-rod arm $131B_2$ of the first link arrangement 10B.

The linkage between the electric assistance motor 115B and the passenger side steering arm 135B$_2$ thus consists of the assistance arm 145B, the assistance steering rod 150B and the passenger side steering arm 135B$_2$, and optionally an assistance gear 140B. The assistance gear 140B, if any, is then generally connected to the assistance arm 145B by means of a splined connection or any other fixed connection. The linkage between the wheels comprises a track rod arrangement comprising a track rod 130B and two track-rod arms 131B$_1$, 131B$_2$.

Furthermore the steering column 121B incorporates a torsion bar 128B with a torque sensor for measuring the steering torque applied by the driver. The assistance torque is actuated by a steering assistance actuator 30B, which at least comprises an electric assistance motor 115B and an ECU 110B, and optionally, but not necessarily, an assistance gear 140B. The control of the level of assistance actuation in the steering assistance actuator is controlled by a control system in an ECU 110B. The assistance actuator may in some embodiments comprise an assisted RCB.

In order to control the assistance of the assistance actuator 30B, the torsion bar 128B with the torsion bar torque sensor is mounted in the (unassisted) RCB 123B on the steering wheel side, between the RCB 123B and the steering column 121B. The sensed value in the torsion bar 128B, the torsion-bar torque, is then sent via a communication means, e.g. a signal bus or similar, to the ECU 110B, that is attached on, or closed by, the electrical motor 115B, as also further discussed with reference to the embodiment described in FIG. 4.

In an alternative of the second embodiment described with reference to FIG. 5, the track rod can be arranged directly between the two steering arms. The first or driver link arrangement is in such an alternative of the second embodiment formed by the Pitman arm and the drag link and the second, assistance actuator, link arrangement comprises the assistance arm 145B and the assistance steering rod 150B.

Through a solution as described with reference to FIG. 5, and with any variation, it becomes possible to have electric power assisted steering of heavy trucks and an arrangement is provided which allows easy packing using the package volumes for RCBs available for left- and right-hand drive vehicles. Both spaces, i.e. on each side of the vehicle, will be used, and a very simple and cost-effective solution is provided.

Figure 6:
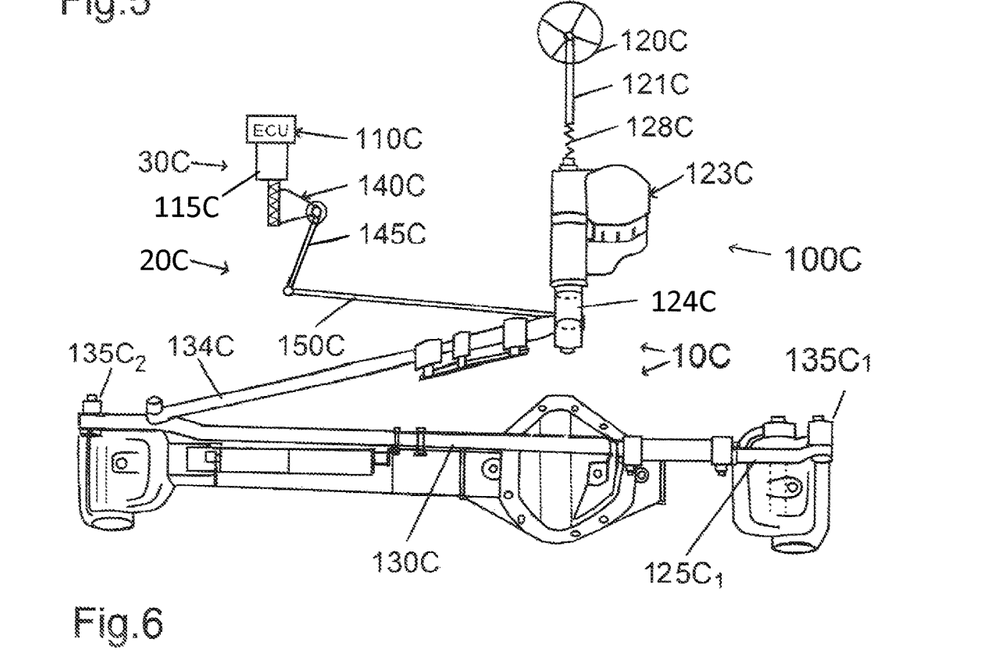

FIG. 6 is a schematic view of a power assisted steering system arrangement 100C according to a third embodiment of the present invention. It comprises a steering wheel 120C and a first link arrangement 10C, also called a driver link arrangement, comprising a linkage similar to the linkage described with reference to FIG. 3 and comprises a linkage between the front axle road wheels (not shown in FIG. 6) and the steering wheel 120B. The first link arrangement 10C here is defined to comprise a steering column 121C, an RCB 123C, a first lever arm, here e.g. a Pitman arm 124C, a drag link 134C, which in FIG. 6 essentially extends in a lateral direction of the vehicle, a track rod arrangement comprising a track rod 130C (with or without tie rods 125C$_1$ indicated in FIG. 6) and two, driver and passenger side steering arms 135C$_1$, 135C$_2$. The RCB 123C and the first lever arm, e.g. the Pitman arm 124C, are interconnected by means of a splined connection or any other fixed connection.

The power assisted steering system arrangement 100C comprises an assistance actuator 30C which here is located on the passenger side of the vehicle, or more generally on the side where the RCB is not disposed, or in short the side opposite to the side where the (unassisted) RCB 123C is located, where space is available.

The power assisted steering system arrangement 100C further comprises a second link arrangement 20C, which also is denoted an assistance actuator link arrangement, for transferring an assistance actuator torque from the assistance actuator 30C to the first link arrangement 10C, here to the Pitman arm 124C. The second link arrangement 20C in this embodiment comprises an assistance arm 145C, an assistance steering rod 150C and optionally an assistance gear 140C. The assistance gear 140C, if any, is then connected to the assistance arm 145C by means of a splined connection or any other fixed connection. The assistance actuator may in some embodiments comprise an assisted RCB.

According to the embodiment of the invention disclosed in FIG. 6, the steering column 121C incorporates a torsion bar 128C with a torque sensor for measuring the steering torque applied by the driver.

The assistance torque is actuated by a steering assistance actuator 30C, which at least comprises an assistance motor 115C and an ECU 110C, and optionally of an assistance gear 140C. The control of the level of assistance actuation in the steering assistance actuator 30C is controlled by a control system in the ECU 110C. The second link arrangement 20C, or the linkage between the electric motor 115C and the Pitman arm 124C, as referred to above consists of an assistance arm 145C and an assistance steering rod 150C between the assistance arm 145C and the Pitman arm 124C wherein the linkage between the wheels also in this embodiment is covered with the track rod 130C and the two steering arms 135C$_1$, 135C$_2$.

In an alternative implementation of the third embodiment (not shown), two track-rod arms are added and the track rod is moved to act between these two track-rod arms.

The first link first link arrangement 10C, also called a driver link arrangement, comprising a linkage similar to the linkage described with reference to FIG. 3 and which comprises a linkage between the front axle road wheels (not shown) and the steering wheel 120C. The first link arrangement is here defined to comprise a steering column 121C, an RCB 123C, a first lever arm, here e.g. a Pitman arm 124C, a drag link 134C, which in FIG. 6 essentially extends in a lateral direction of the vehicle, a track rod arrangement comprising a driver side steering arm 135C$_1$ and two (driver side and passenger side) track-rod arms with a track rod 130C in between.

The power assisted steering system arrangement 100C further comprises a second link arrangement 20C, also denoted an assistance actuator link arrangement, for transferring an assistance actuator torque from an assistance actuator 30C to the first link arrangement 10C, here to the track rod arrangement, more particularly to the passenger side track-rod arm.

The second link arrangement 20C in this embodiment comprises an assistance arm 145C, an assistance steering rod 150C and a passenger side steering arm 135C$_2$ connected or articulated to the passenger side track-rod arm of the first link arrangement 10C.

Also through this embodiment and its variants, it becomes possible to provide electric power assisted steering of heavy trucks and an arrangement is provided which easily will be possible to pack in the package volumes for RCBs available for left and right hand drive vehicles, and both spaces will be used, and a very simple and cost-effective solution is provided.

It should be clear that the inventive concept is applicable to systems with one or two tie rods, or to systems with no tie rod, and it is not limited to the specifically illustrated embodiments which hence can be adapted correspondingly.

It should be clear that the invention is not limited to the specifically illustrated embodiments but that it can be varied in a number of ways within the scope of the appended claims.

The invention claimed is:

1. A power assisted steering system arrangement for a vehicle comprising:
   a steering wheel;
   a first, driver, link arrangement which comprises a linkage between the steering wheel and the front axle road wheels of the vehicle comprising:
      a steering column;
      a Recirculating Ball Joint, RCB, arranged or mounted on a first (frame) side of the vehicle;
      a track rod arrangement for steering the front axle road wheels;
      a first lever arm arranged to transfer a torque applied by the driver via the steering wheel to the track rod arrangement, hence directly or indirectly providing a connection between the RCB and the track rod arrangement;
      at least a torsion bar with a torsion-bar torque sensor associated with, or incorporated in, the steering column;
   an assistance actuator, arranged or mounted on a second side of the vehicle, opposite to the side of the vehicle where the RCB is arranged or mounted, said assistance actuator comprising at least an electric motor and an Electronic Control Unit (ECU) controlling the electric motor depending on control signals received from the torsion-bar torque sensor; and
   an assistance actuator link arrangement, said assistance actuator link arrangement being connected to said track rod arrangement, so that a steering torque applied by the driver as well as an assistance actuator torque provided or applied by the assistance actuator are transferred to the track rod arrangement steering the front axle road wheels of the vehicle,
   wherein the first link arrangement comprises a drag link arranged between the first lever arm and the track rod arrangement and extending substantially in a longitudinal direction of the vehicle,
   the track rod arrangement comprises a track rod on each end pivotally connected to a first and a second track rod arm respectively, and a first side steering arm,
   the first lever arm is connected to, and arranged to transfer the driver torque to the track rod via the drag link and the first steering arm,
   the second link arrangement comprises an assistance arm in one end directly or indirectly connected to the assistance actuator,
   an assistance steering rod pivotally connected to the other end of the assistance arm,
   a second steering arm being connected to the other end of the assistance steering rod, and
   the second link arrangement being arranged to transfer the assistance torque from the actuator to the track rod.

2. The steering system arrangement according to claim 1, wherein the first lever arm comprises a Pitman arm.

3. The steering system arrangement according to claim 1, wherein the assistance actuator further also comprises a gear.

4. The steering system arrangement according to claim 3, wherein the gear is arranged between the electric motor and the assistance arm.

5. The steering system arrangement according to claim 1, wherein the assistance actuator further also comprises a sector worm gear, an assisted RCB or a spur gear.

6. The steering system arrangement according to claim 1, wherein the RCB is arranged on the driver side of the vehicle and in that the assistance actuator is arranged on the passenger side of the vehicle, or vice versa.

7. The steering system arrangement according to claim 1, wherein the track rod on each end is pivotally connected to a first and a second track rod arm respectively, the first track rod arm being connected to the first steering arm of the first link arrangement and the second track rod arm being connected to the second steering arm of the second link arrangement.

8. The steering system arrangement according to claim 1, wherein the track rod is arranged between, directly connecting to, the first steering arm of the first link arrangement and the second steering arm of the second link arrangement.

9. The steering system arrangement according to claim 1, wherein the vehicle comprises a truck or a pick-up.

10. A power assisted steering system arrangement for a vehicle comprising:
    a steering wheel;
    a first, driver, link arrangement which comprises a linkage between the steering wheel and the front axle road wheels of the vehicle comprising:
       a steering column;
       a Recirculating Ball Joint, RCB, arranged or mounted on a first (frame) side of the vehicle;
       a track rod arrangement for steering the front axle road wheels;
       a first lever arm arranged to transfer a torque applied by the driver via the steering wheel to the track rod arrangement, hence directly or indirectly providing a connection between the RCB and the track rod arrangement;
       at least a torsion bar with a torsion-bar torque sensor associated with, or incorporated in, the steering column;
    an assistance actuator, arranged or mounted on a second side of the vehicle, opposite to the side of the vehicle where the RCB is arranged or mounted, said assistance actuator comprising at least an electric motor and an Electronic Control Unit (ECU) controlling the electric motor depending on control signals received from the torsion-bar torque sensor;
    an assistance actuator link arrangement, said assistance actuator link arrangement being connected to said track rod arrangement, so that a steering torque applied by the driver as well as an assistance actuator torque provided or applied by the assistance actuator are transferred to the track rod arrangement steering the front axle road wheels of the vehicle;
    the first link arrangement further comprises a drag link arranged between the first assistance arm and the track rod arrangement;
    the track rod arrangement comprises a track rod on the outer ends connected to a first and second steering arm respectively;
    the second link arrangement comprises an assistance arm in one end directly or indirectly connected to the assistance actuator, an assistance steering rod pivotally connected to the other end of the assistance arm; and
    the assistance steering rod in its other end being connected to the first lever arm of the first link arrangement, the second link arrangement hence being arranged to transfer the assistance torque from the actuator to the first link arrangement via the first lever arm.

11. The steering system arrangement according to claim 10, wherein the track rod at each end is pivotally connected to a respective first and a second track rod arm, said first and second track rod arms being connected to the first and second steering arms respectively.

12. The steering system arrangement according to claim 10, wherein the vehicle comprises a truck or a pick-up.

13. A power assisted steering system arrangement for a vehicle comprising:
- a steering wheel;
- a first, driver, link arrangement which comprises a linkage between the steering wheel and the front axle road wheels of the vehicle comprising:
  - a steering column;
  - a Recirculating Ball Joint, RCB, arranged or mounted on a first (frame) side of the vehicle;
  - a track rod arrangement for steering the front axle road wheels;
  - a first lever arm arranged to transfer a torque applied by the driver via the steering wheel to the track rod arrangement, hence directly or indirectly providing a connection between the RCB and the track rod arrangement;
- at least a torsion bar with a torsion-bar torque sensor associated with, or incorporated in, the steering column;
- an assistance actuator, arranged or mounted on a second side of the vehicle, opposite to the side of the vehicle where the RCB is arranged or mounted, said assistance actuator comprising at least an electric motor and an Electronic Control Unit (ECU) controlling the electric motor depending on control signals received from the torsion-bar torque sensor;
- an assistance actuator link arrangement, said assistance actuator link arrangement being connected to said track rod arrangement, so that a steering torque applied by the driver as well as an assistance actuator torque provided or applied by the assistance actuator are transferred to the track rod arrangement steering the front axle road wheels of the vehicle;
- the first link arrangement further comprises a drag link extending in a substantially lateral direction of the vehicle arranged between the first assistance arm and the track rod arrangement;
- the track rod arrangement comprises a track rod on the outer ends connected to a first and second steering arm respectively;
- the second link arrangement comprises an assistance arm in one end directly or indirectly connected to the assistance actuator, an assistance steering rod pivotally connected to the other end of the assistance arm; and
- the assistance steering rod in its other end being connected to the first lever arm of the first link arrangement, the second link arrangement hence being arranged to transfer the assistance torque from the actuator to the first link arrangement via the first lever arm.

14. The steering system arrangement according to claim 13, wherein the vehicle comprises a truck or a pick-up.

* * * * *